Patented Nov. 10, 1936

2,060,122

UNITED STATES PATENT OFFICE 2,060,122

PROCESS FOR THE MANUFACTURE OF ARTIFICIAL RESINS AND ARTIFICIAL MASSES BY CONDENSATION OF DICYANDIAMIDE WITH FORMALDEHYDE

Kurt Ripper, Berlin, Germany

No Drawing. Application July 9, 1931, Serial No. 549,798. In Austria July 30, 1930

5 Claims. (Cl. 260—3)

The invention relates to the production of artificial resins, molding compositions and artificial masses by the condensation of dicyandiamide with formaldehyde.

According to the German patents to Wallasch No. 323,665 and No. 325,647 of 1919, the condensation of dicyandiamide and formaldehyde in the presence of acids, or without any condensing agents, yields oily or glue-like products which may be used as a substitute for glycerine or as water soluble adhesives.

In my prior Patent 1,812,374, I have described the reaction of dicyandiamide and formaldehyde by which it is possible to obtain resinous condensation products capable of being hardened under the combined or separate action of heat and pressure and converted into infusible artificial masses. The condensation products of dicyandiamide and formaldehyde thus produced, when heated for a sufficiently long time, are hydrophobe resins which, on cooling separate from the reaction mixture, and when contacted with water are disintegrated into a powder which dries rapidly. This powder is an excellent molding material in the dry state.

In my British Patent 287,177 I have described a process of making a resin-like condensation product from formaldehyde and dicyandiamide and other materials such as urea, thiourea, phenols or cresols, which are themselves capable of resinification with formaldehyde. The mixed colloids produced according to this method have properties analogous to those of the resin obtained by reacting dicyandiamide alone with formaldehyde.

In my British Patent 323,047, I have described a process by which artificial masses are made from dicyandiamide, formaldehyde and a protein substance. This process may be carried out with or without the use of acid or alkaline condensing agents, and yields chiefly molding compositions for hot pressing.

Still another way of making a heat hardenable artificial resin from dicyandiamide and formaldehyde is described in my British Patent 314,359. Under the mild working conditions of this process (a short heating at less than 100° C.) hydrophile condensation products are obtained which on cooling remain dissolved in the reaction mixture. An evaporation process is employed to separate this resin from the solution in which it is generated.

The immediate formation of hydrophobe reaction products has many advantages, not only with respect to the production of the resins and their further treatment, but also in view of the quality of the final product. These hydrophobe resins possess many of the properties which are of importance for the manufacture of quick molding compositions. They can, for instance, as stable colloidal solutions be brought into a state of high and perfectly uniform polymerization by continued heating and in this liquid phase they can be mixed with fibres and fillers to give a homogeneous mass. As a result the hot pressing need serve only for the purpose of mechanical shaping. These materials in their highest state of polymerization are still capable of flowing provided a small amount of water is permitted to remain after the drying process has been completed. The drying of these resins is easily accomplished because of the hydrophobe character.

The present invention relates to a process of improving the water-resistance of the hydrophobe dicyandiamide resins described above. I have discovered that when the dicyandiamide-formaldehyde reaction is carried out at a hydrogen ion concentration which is slightly above neutrality (pH 7) a hydroscopic substance, dicyandiamidine, is produced which in the final product unfavorably affects the water resistance. Thus, when the reaction between dicyandiamide and commercial formaldehyde is carried out without condensing agents, the normal slight acidity of the commercial formaldehyde permits the formation of dicyandiamidine which carries over into the final product.

According to my present invention, the condensation of dicyandiamide and formaldehyde is carried out at a lower hydrogen ion concentration than that corresponding to the value of pH 5, preferably at a hydrogen ion concentration between pH 8 and pH 10. When this is done a hydrophobe resin is obtained which is most appropriate for the manufacture of molding compositions. In addition the condensation takes place very rapidly within the stated hydrogen ion range.

In practising the invention the condensation may be carried out for instance in the presence of suitable quantities of substances splitting off hydroxyl ions, an addition of some buffering mixtures which have a favorable action within the above indicated hydrogen ion range being useful. Under these working conditions already after boiling the mixture of the ingredients for three quarters of an hour, a reaction mixture is generated, which becomes turbid in the heat and from which on cooling a tough hydrophobe resin is precipitated. For the further treatment the hydrophobe resin may be caused to separate out either by allowing the mixture to cool down or by the addition of water, whereafter it is washed, then melted again and mixed with fibrous material of any convenient kind (of vegetable, animal or mineral origin). Alternatively, if a test shows that the hydrophobe resin, precipitating on cooling, has already been formed, the reaction mixture may in the hot condition be mixed with fibrous materials in a kneading machine or in a roller mill. In both cases the mixture is then treated by heat until the required degree of polymerization has been achieved, whereat it becomes dry, and finally subjected to the combined or separate action of heat and pressure.

The condensation may also be carried out at temperatures below the boiling point of the formaldehyde solution. On the other hand it may advantageously be effected under increased pressure.

Moreover I have found, that the quality of the final products may further be improved to a noticeable degree by incorporating metal salts with the condensation products or with the molding powders, for instance copper sulphate, zinc chloride, nitrate of lead, nickel sulphate, cobaltous chloride, aluminium sulphate, stannous chloride, barium chloride or mercury chloride. The effect of these additions is most likely due to the fact that the dicyandiamidine, which may have been formed in spite of the above described operating conditions is bound thereby. It may also be assumed, that these salts exercise besides an assisting coagulating action.

EXAMPLES

I 84 grammes of dicyandiamide are dissolved in 150 grammes of a 30% formaldehyde solution (which proportions correspond to a relation of 1 mol. of dicyandiamide to 1½ mols. of formaldehyde), whereafter 20 cubic-centimeters of a 0.1 N solution of caustic soda are added. This mixture is now boiled for three quarters of an hour. After this time a highly hydrophobe resin, precipitating in the cold, will have been generated. The solution is without preliminary cooling mixed in a kneading machine with 84 grammes of cellulose, either in vacuo or not.

The mixture thus obtained is for the purpose of polymerizing and drying heated, if preferred in two stages of temperature, care being taken to let behind so much water, that sufficient flowing quality within the hot press is ensured thereby. The final contents of water most suitable for this purpose amounts to about 5 per cent. Thereafter any convenient quantities and any kind of pigments or coloring substances may be incorporated with the mass.

In this manner there are obtained molding compositions furnishing by a short hot pressing molded pieces which, when kept in water for a prolonged time, take up very small traces thereof and are adapted therefore for various electrotechnical and other industrial purposes.

II 63 grams of dicyandiamide are dissolved in 150 grammes of a 30 per cent formaldehyde solution (these proportions corresponding to a relation of 1 mol. of dicyandiamide to 2 mols. of formaldehyde) and after addition of 40 cubic centimeters of a 0.1 N solution of caustic soda,
maintained during one hour and three quarters at a temperature of about 80° C. The further treatment is the same as set forth in Example I.

III 1.16 grammes of boric acid and 10 cubic centimeters of a normal solution of caustic soda are dissolved in 300 cubic centimeters of a 30% aqueous formaldehyde solution. Thereafter 84 grammes of dicyandiamide are added, which amount corresponds to a relation of 1 mol. of dicyandiamide to 3 mols. of formaldehyde.

The hydrogen ion concentration adjusted by this buffering mixture consisting of borate and sodium hydroxide corresponds to a pH of about 9.4.

The condensation is carried out exactly in the same manner as has been described in the Examples I and II.

Into the molding compositions produced according to the Examples I to III, together with the pigment for instance 1 to 2 per cent of stannous chloride may be introduced.

Instead of a molding composition for hot pressing a composition suitable for being pressed in in the cold may be prepared by continuing the polymerization and the drying only so far that a mass is obtained, which permits molding at lower temperatures, the final polymerization and drying being in such a case effected after the molding.

Instead of a homogeneous molding composition also laminated sheets may be made by impregnating paper or fabrics of any kind with the reaction solution in its initial or final state and uniting a number of these paper sheets or fabrics, after drying and polymerization of the binding agent, by hot pressing in a plate press.

Instead of the dicyandiamide, derivatives of the same, as well as its raw aqueous solutions, can be used, and instead of the formaldehyde, its polymers can be used.

The hydrogen ion concentration ($h$) is defined by the expression $10^{-x}$; consequently $\log h = -x$ or $-\log h = x$. For the expression $-\log h$ Sörenson has introduced the symbol pH. It follows therefrom that with increasing hydrogen ion concentration the pH value decreases and vice versa. Thus the term "a pH above 7" used in the following claims, defines a range of hydrogen ion concentration that is below that corresponding to a pH=7.

What I claim is:

1. The process of producing a hydrophobe resinous condensation product which comprises dissolving boric acid and sodium hydroxide in an aqueous formaldehyde solution, the boric acid and sodium hydroxide being so proportioned that a solution having an alkalinity equivalent to about pH 9.4 results, adding dicyandiamide to said solution and applying heat thereto.

2. The process of reacting dicyandiamide and formaldehyde to give a hyrophobe resinous product capable of being hardened, under the influence of heat and pressure, into a relatively water insensible finished material which comprises initiating the reaction by heating a solution in which dicyandiamide and formaldehyde are the principal ingredients in the presence of a substance having alkaline properties sufficient to provide a pH of at least 5 and continuing the reaction until the hydrophobe resinous product, capable of separating from the resultant solution on cooling, is formed.

3. A material containing a product substantially identical with that resulting from the process set forth in claim 2.

4. The process of making a hydrophobe resinous product capable of being hardened under the influence of heat and pressure to give a water insensible finished material which comprises heating dicyandiamide and formaldehyde in an aqueous medium wherein the dicyandiamide and formaldehyde are the principal ingredients, and in which the hydrogen ion pH value is maintained at a value from about 8 to about 10 so that undesirable water soluble products of side reactions will not be formed in an amount sufficient to render the final heat hardened product appreciably sensible to water.

5. A material containing a product substantially identical with that resulting from the process set forth in claim 4.

KURT RIPPER.